United States Patent
Lee et al.

(10) Patent No.: US 8,808,885 B2
(45) Date of Patent: Aug. 19, 2014

(54) VOLTAGE SENSING MEMBER AND BATTERY MODULE EMPLOYED WITH THE SAME

(75) Inventors: BumHyun Lee, Seoul (KR); Jin Kyu Lee, Busan (KR); Jongmoon Yoon, Daejeon (KR); Jae Hun Yang, Daejeon (KR); Yongshik Shin, Daejeon (KR); Dal Mo Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 356 days.

(21) Appl. No.: 12/858,143

(22) Filed: Aug. 17, 2010

(65) Prior Publication Data

US 2011/0076531 A1    Mar. 31, 2011

Related U.S. Application Data

(63) Continuation of application No. PCT/KR2010/002836, filed on May 4, 2010.

(30) Foreign Application Priority Data

May 4, 2009  (KR) .................. 10-2009-0038978

(51) Int. Cl.
*H01M 2/20* (2006.01)
*H01M 10/48* (2006.01)

(52) U.S. Cl.
USPC .............................. 429/61; 429/92; 429/160

(58) Field of Classification Search
USPC ............................................ 429/61, 92, 160
See application file for complete search history.

(56) References Cited

U.S. PATENT DOCUMENTS

| | | | |
|---|---|---|---|
| 7,148,708 B1 * | 12/2006 | Potempa | 324/724 |
| 2008/0299457 A1 * | 12/2008 | Muraoka et al. | 429/217 |
| 2010/0021802 A1 | 1/2010 | Yang et al. | |
| 2010/0035142 A1 | 2/2010 | Ha et al. | |

FOREIGN PATENT DOCUMENTS

| | | | |
|---|---|---|---|
| CN | 101395490 A | | 3/2009 |
| CN | 101395739 A | | 3/2009 |
| EP | 1 453 190 A1 | | 9/2004 |
| JP | 2000-260486 A | | 9/2000 |
| JP | 2003-338275 A | | 11/2003 |
| JP | 2005-116440 A | | 4/2005 |
| KR | 10-2008-0025428 A | | 3/2008 |
| KR | 10-2008-0027504 A | | 3/2008 |
| KR | 2010035944 A | * | 4/2010 |
| WO | WO 2007102670 A1 | * | 9/2007 |

* cited by examiner

*Primary Examiner* — Ula C Ruddock
*Assistant Examiner* — Frank Chernow
(74) *Attorney, Agent, or Firm* — Birch, Stewart, Kolasch & Birch, LLP

(57) ABSTRACT

Disclosed herein is a battery module configured in a structure in which two or more battery cells, each of which has electrode terminals formed at one end or opposite ends thereof, are stacked in a state in which the battery cells are electrically connected to each other, wherein the electrode terminals of the battery cells are formed of plate-shaped conductive members, the electrode terminals of the battery cells are folded such that the electrode terminals are in tight contact with each other to form a bent connection part at an electrical connection region between the battery cells, and the bent connection part is surrounded by a voltage sensing member mounted to the bent connection part.

20 Claims, 4 Drawing Sheets

VOLTAGE SENSING MEMBER AND BATTERY MODULE EMPLOYED WITH THE SAME

CROSS REFERENCE TO RELATED APPLICATIONS

This application is a Continuation of PCT International Application No. PCT/KR2010/002836 filed on May 4, 2010, which claims the benefit of Patent Application No. 10-2009-0038978 filed in Republic of Korea, on May 4, 2009. The entire contents of all of the above applications is hereby incorporated by reference into the present application.

TECHNICAL FIELD

The present invention relates to a voltage sensing member and a battery module including the same, and, more particularly, to a battery module configured in a structure in which plate-shaped battery cells, each of which has electrode terminals formed at one end or opposite ends thereof, are stacked in a state in which the battery cells are electrically connected to each other, wherein the electrode terminals of the battery cells are formed of plate-shaped conductive members, the electrode terminals of the battery cells are folded such that the electrode terminals are in tight contact with each other to form a bent connection part at an electrical connection region between the battery cells, and the bent connection part is surrounded by a voltage sensing member mounted to the bent connection part.

BACKGROUND ART

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle- or large-sized devices, such as vehicles, use a middle- or large-sized battery module having a plurality of battery cells electrically connected to one another because high power and large capacity are necessary for the middle- or large-sized devices.

Preferably, the middle- or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle- or large-sized battery module. Especially, much interest is currently focused on the pouch-shaped battery, which uses an aluminum laminate sheet as a sheathing member, because the weight of the pouch-shaped battery is small, and the manufacturing costs of the pouch-shaped battery are low.

FIG. 1 is a perspective view typically illustrating a conventional pouch-shaped battery. A pouch-shaped battery 10 shown in FIG. 1 is configured in a structure in which two electrode leads 11 and 12 protrude from the upper and lower ends of a battery body 13, respectively, while the electrode leads 11 and 12 are opposite to each other. A sheathing member 14 includes upper and lower sheathing parts. That is, the sheathing member 14 is a two-unit member. An electrode assembly (not shown) is received in a receiving part which is defined between the upper and lower sheathing parts of the sheathing member 14. The opposite sides 14b and the upper and lower ends 14a and 14c, which are contact regions of the upper and lower sheathing parts of the sheathing member 14, are bonded to each other, whereby the pouch-shaped battery 10 is manufactured. The sheathing member 14 is configured in a laminate structure of a resin layer/a metal film layer/a resin layer. Consequently, it is possible to bond the opposite sides 14b and the upper and lower ends 14a and 14c of the upper and lower sheathing parts of the sheathing member 14, which are in contact with each other, to each other by applying heat and pressure to the opposite sides 14b and the upper and lower ends 14a and 14c of the upper and lower sheathing parts of the sheathing member 14 so as to weld the resin layers thereof to each other. According to circumstances, the opposite sides 14b and the upper and lower ends 14a and 14c of the upper and lower sheathing parts of the sheathing member 14 may be bonded to each other using a bonding agent. For the opposite sides 14b of the sheathing member 14, the same resin layers of the upper and lower sheathing parts of the sheathing member 14 are in direct contact with each other, whereby uniform sealing at the opposite sides 14b of the sheathing member 14 is accomplished by welding. For the upper and lower ends 14a and 14c of the sheathing member 14, on the other hand, the electrode leads 11 and 12 protrude from the upper and lower ends 14a and 14c of the sheathing member 14, respectively. For this reason, the upper and lower ends 14a and 14c of the upper and lower sheathing parts of the sheathing member 14 are thermally welded to each other, while a film-shaped sealing member 16 is interposed between the electrode leads 11 and 12 and the sheathing member 14, in consideration of the thickness of the electrode leads 11 and 12 and the difference in material between the electrode leads 11 and 12 and the sheathing member 14, so as to increase sealability of the sheathing member 14.

A battery module is a structural body including a plurality of battery cells which are combined with each other, with the result that the safety and operating efficiency of the battery module may be lowered when overvoltage, overcurrent, and overheating occur in some of the battery cells. Consequently, a sensing unit for sensing the overvoltage, overcurrent, and overheating is needed. For example, a voltage sensor or a temperature sensor is connected to the battery cells so as to sense and control the operation of the battery cells in real time or at predetermined time intervals. However, mounting or connection of such a sensing unit complicates assembly of the battery module. Furthermore, a possibility of occurrence of a short circuit is increased due to a plurality of wires necessary to mount or connect the sensing unit.

Specifically, some conventional arts have proposed battery modules in which a voltage sensor contacts electrode leads of a battery cell in a point contact manner via a spring to sense voltage of the battery cell, a voltage sensor contacts electrode leads of a battery cell via a bolt and a rivet, or a voltage sensor is connected to electrode leads of a battery cell by welding. For example, Japanese Patent Application Publication No. 2005-116440 discloses an assembled battery configured in a structure in which a plurality of single batteries are stacked, wherein a plurality of voltage sensing terminals for sensing voltages of the single batteries are arranged in the stacking direction of the single batteries, and the voltage sensing terminals are provided with a voltage sensing line withdrawal unit for connecting the voltage sensing terminals to an external device in a bundle.

In the above publication, however, the voltage sensing terminals are electrically connected to electrode tabs of the respective single batteries by ultrasonic welding. As a result, the electrode tabs of the respective single batteries may be deformed. Also, a space in which the above members are to be coupled, welded, or soldered for electrical connection is needed, with the result that the overall size of the system is increased, which is not preferable. Consequently, there is a high necessity for a battery module which has a more compact size and exhibits high structural stability.

In addition, for devices, such as vehicles, to which external force, such as vibration or impact, is continuously applied, the increase in contact resistance at the electrical connection region may cause unstable output and occurrence of a short circuit. Also, sensing defects may occur due to accumulation of moisture generated during use of the battery module for a long period of time.

DISCLOSURE

Technical Problem

Therefore, the present invention has been made to solve the above problems, and other technical problems that have yet to be resolved.

Specifically, it is an object of the present invention to provide a battery module configured in a structure in which a voltage sensing member contacts a bent connection part constituted by bending electrode terminals of the battery cells at a plurality of positions in a surface contact manner, thereby improving reliability of operation and measurement.

It is another object of the present invention to provide a battery module configured in a structure in which a voltage sensing member is mounted at the upper end of the battery module, thereby preventing accumulation of moisture.

Technical Solution

In accordance with one aspect of the present invention, the above and other objects can be accomplished by the provision of a battery module configured in a structure in which two or more battery cells, each of which has electrode terminals formed at one end or opposite ends thereof, are stacked in a state in which the battery cells are electrically connected to each other, wherein the electrode terminals of the battery cells are formed of plate-shaped conductive members, the electrode terminals of the battery cells are folded such that the electrode terminals are in tight contact with each other to form a bent connection part at an electrical connection region between the battery cells, and the bent connection part is surrounded by a voltage sensing member mounted to the bent connection part.

Generally, a battery module is configured in a structure in which a voltage sensing member is connected to electrode terminals of battery cells via a spring or by welding such that the voltage sensing member is in point contact with the electrode terminals of the battery cells so as to measure voltage of the battery cells. In this structure, however, reliability of measurement is deteriorated due to change of contact resistance. In addition, a process of manufacturing a battery module is complicated.

On the other hand, the battery module according to the present invention is configured in a structure in which electrode terminals of battery cells are folded to form a bent connection part, and a voltage sensing member is mounted to the bent connection part such that the bent connection part is surrounded by the voltage sensing member. This connection structure is very stable, with the result that reliability of measurement is high, a manufacturing process is simplified, and excellent durability is exhibited. In the battery module according to the present invention, therefore, it is possible to effectively measure voltage of the battery cells by the provision of the electrode terminal connection part and the voltage sensing member, which are configured in the specific forms as described above.

Preferably, each of the battery cells is a plate-shaped battery cell. An example of the plate-shaped battery cell may be a secondary battery configured in a structure in which an electrode assembly is mounted in a battery case formed of a laminate sheet including a resin layer and a metal layer, and a cathode lead made of aluminum and an anode lead made of copper protrude from one end or opposite ends of the battery case. Specifically, each of the battery cells may be configured in a structure in which a cathode lead made of aluminum and an anode lead made of copper protrude from one end or opposite ends of each of the battery cells.

The electrode assembly is configured in a structure in which a cathode lead and an anode lead are stacked in a state in which a separator is disposed between the cathode lead and the anode lead such that the electrode assembly can be charged and discharged. For example, the electrode assembly may be configured in a jelly-roll type structure, in a stack type structure, or in a jelly-roll and stack type structure. More preferably, the secondary battery with the above-stated construction is a lithium secondary battery.

The electrical connection region between the battery cells may be a parallel connection region between the battery cells or a series connection region between the battery cells. Preferably, the electrical connection region between the battery cells is a series connection region between the battery cells.

At the bent connection part, the electrode terminals may be connected to each other in various manners. Preferably, the electrode terminals are connected to each other at the bent connection part by welding. In this case, the electrode terminals may be folded to form the bent connection part after welding. Alternatively, electrode terminals may be connected to each other by welding in a state in which the electrode terminals are folded to form the bent connection part.

In a preferred example, the bent connection part may be configured in a structure in which an electrode terminal exhibiting relatively low ductility constitutes an inside electrode terminal, and an electrode terminal exhibiting relatively high ductility constitutes an outside electrode terminal. Ductility means a stretching property of metal materials. That is, the outside electrode terminal having higher ductility than the inside electrode terminal is folded such that the outside electrode terminal surrounds the inside electrode terminal. As a result, the inside electrode terminal is protected by the outside electrode terminal. In addition, the bent connection part has a thickness equivalent to four times the thickness of each of the electrode terminals. As a result, damage to the electrode terminals is effectively prevented. For example, the outside electrode terminal may be made of copper exhibiting relatively high ductility, and the inside electrode terminal may be made of aluminum exhibiting lower ductility than copper.

Meanwhile, it is preferable for the battery cells to be stacked in a state in which the bent connection part of the battery cells is perpendicular to the ground so as to constitute a battery module such that the voltage sensing member is mounted to the battery cells to effectively measure voltage of the battery cells.

In the above structure, the voltage sensing member is mounted to the upper part of the bent connection part. Consequently, connection to an external circuit is easily achieved, and, in addition, moisture generated and condensed at the voltage sensing member and the bent connection part during use of the battery module for a long period of time falls to the ground by gravity, with the result that moisture is prevented from accumulating at the voltage sensing member and the bent connection part, and therefore, it is possible to effectively prevent occurrence of sensing defects.

A preferred example of the voltage sensing member that is capable of exhibiting the above effects may include a main body part configured to surround at least parts of opposite sides of the bent connection part and an upper end of the bent connection part, an elastic connection part disposed between the sides of the bent connection part and the main body part, and a linear connection part extending from a top of the main body part.

That is, contact between the bent connection part of the battery cells and the elastic connection part of the voltage sensing member is elastically achieved, thereby securing stable mounting and connection of the voltage sensing member to the bent connection part. Consequently, easy assembly is possible, and effective voltage measurement of the battery cells is possible.

In the above structure, the elastic connection part is preferably configured in a structure in which the elastic connection part is repeatedly curved to form two or more contact points at the sides of the bent connection part and the main body part. For example, the elastic connection part may be a leaf spring which is repeatedly curved. That is, voltage of the battery cells is measured at two or more contact points, thereby greatly improving contact reliability of the voltage sensing member.

Preferably, the elastic connection part includes two elastic connection parts connected to the opposite sides of the bent connection part. Consequently, a plurality of contact points are provided, and, in addition, the voltage sensing member including the two elastic connection parts is mounted to the bent connection part while the two elastic connection parts of the voltage sensing member elastically press the opposite sides of the bent connection part. As a result, it is possible to easily achieve electrical connection between the voltage sensing member and the bent connection part without welding.

The voltage sensing member may further include an insulative cap mounted to the outside of the main body part. The insulative cap protects the voltage sensing member mounted to the bent connection part from the outside, thereby preventing occurrence of a short circuit and deformation of the bent connection part.

In the above structure, the insulative cap may be connected to the bent connection part in a structure in which a connection wire is disposed at the top of the insulative cap. As previously described, this structure is not affected by moisture generated during use of the battery module for a long period of time, and therefore, it is possible to effectively prevent occurrence of sensing defects.

The insulative cap may be configured in a structure corresponding to the outside shape of the main body part, and the insulative cap is further mounted to the outside of the main body part in a state in which the main body part is mounted to the bent connection part. Consequently, the insulative cap serves to stably maintain a state in which the voltage sensing member is mounted to the bent connection part.

The linear connection part is not particularly restricted as long as the linear connection part extends from the top of the main body part in a state in which the linear connection part can be electrically connected. Preferably, the linear connection part is a wire connection part.

Meanwhile, the battery cells may constitute a battery module according to the present invention in various manners. For example, two or more battery cells may be mounted in a cell cover, such that the battery cells are surrounded by the cell cover, to constitute a unit module, and two or more unit modules may be stacked to constitute a battery module.

Specifically, two or more battery cells are stacked and surrounded by a cell cover, and therefore, it is possible to manufacture a plurality of unit modules in a state in which the battery cells are stably mounted. The manufactured unit modules are assembled to constitute a battery module.

Meanwhile, a middle- or large-sized battery pack uses a plurality of battery cells so as to provide high power and large capacity. It is necessary to more accurately measure the voltage of battery modules constituting the battery pack so as to secure safety of the battery modules.

In accordance with another aspect of the present invention, therefore, there is provided a battery pack manufactured by combining the battery modules based on desired power and capacity.

The battery pack according to the present invention is structurally stable, and therefore, the battery pack is preferably used as a power source for electric vehicles, hybrid electric vehicles, or plug-in hybrid electric vehicles, electric motorcycles, or electric bicycles, which have a limited installation space and are exposed to continuous force such as vibration and impact, with the result that there is a strong possibility of occurrence of a short circuit during the operation of the battery pack. Of course, the vehicles include large-sized vehicles, such as buses and trucks, as well as middle- or small-sized vehicles.

Advantageous Effects

As is apparent from the above description, the battery module according to the present invention is configured in a structure in which a voltage sensing member contacts a bent connection part constituted by bending electrode terminals of the battery cells at a plurality of positions in a surface contact manner, thereby improving reliability of operation and measurement. Also, the battery module is configured in a structure in which the voltage sensing member is mounted at the upper end of the battery module, thereby preventing accumulation of moisture.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
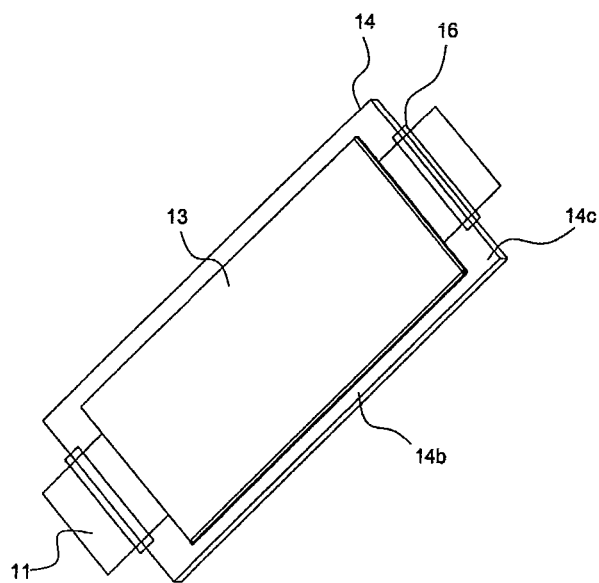
FIG. 1 is a perspective view illustrating a conventional pouch-shaped battery.
Figure 2:
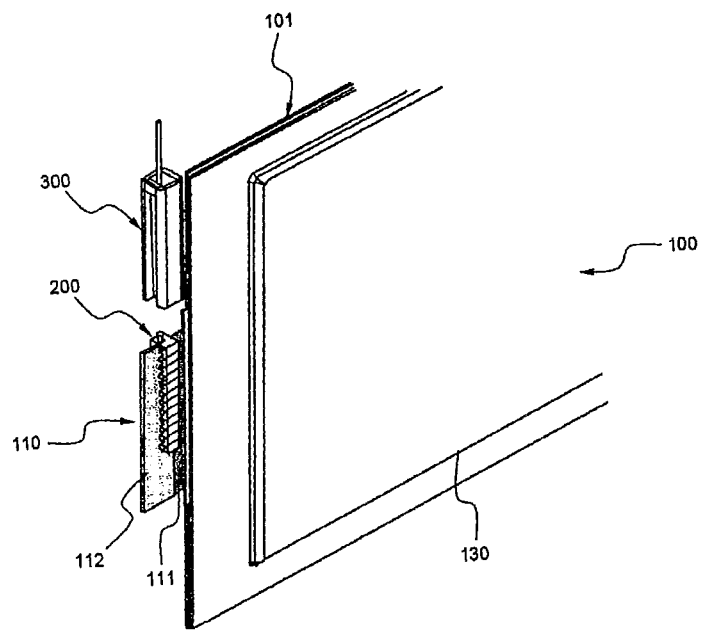
FIG. 2 is a partial perspective view illustrating battery cells to which a voltage sensing member according to an embodiment of the present invention is mounted.

FIG. 2 is a partial perspective view typically illustrating battery cells to which a voltage sensing member according to an embodiment of the present invention is mounted.

Referring to FIG. 2, a battery cell 100 is configured in a structure in which a cathode terminal 111 and an anode terminal 112 are disposed at opposite ends of the battery cell 100, and an electrode assembly is mounted in a pouch-shaped battery case 130.

Two battery cells 100 and 101 constituting a unit module are coupled in series to each other by interconnecting a cathode terminal 111 disposed at one end of the battery cell 100 and an anode terminal 112 disposed at one end of the battery cell 101 corresponding to the end of the battery cell 100 where the cathode terminal 111 is disposed by welding, and then the electrode terminals 111 and 112 of the battery cells 100 and 101 are folded such that the electrode terminals 111 and 112 are in tight contact with each other to form a bent connection part 110.

A voltage sensing member 200 is mounted to the bent connection part 110 such that the voltage sensing member 200 surrounds the bent connection part 110. An insulative cap 300 is mounted to the outside of the voltage sensing member 200.

Figure 3:
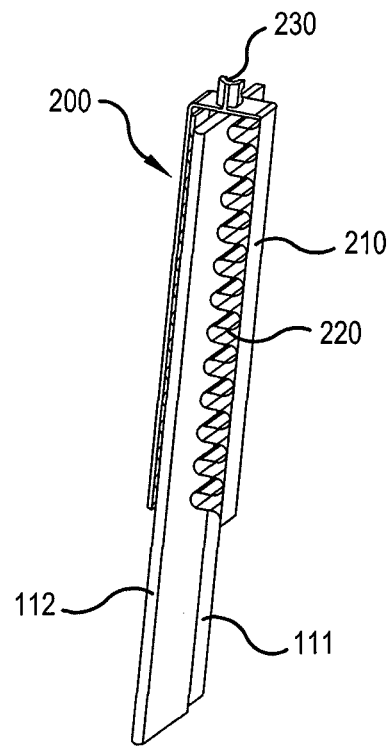
FIG. 3 is a perspective view illustrating electrode terminals to which the voltage sensing member of FIG. 2 is mounted.
Figure 4:
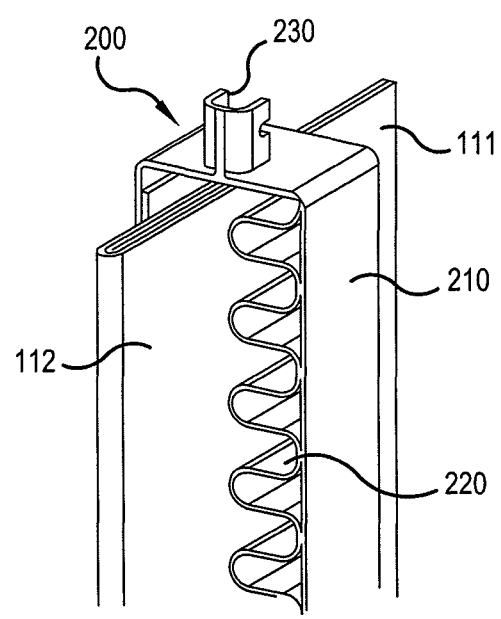
FIG. 4 is a partially enlarged view of FIG. 3.
Figure 5:
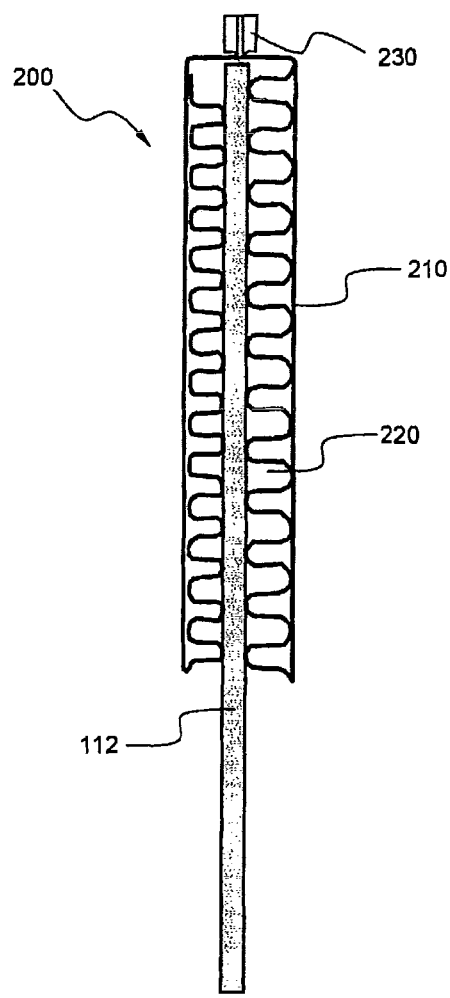
FIG. 5 is a side view of FIG. 3.

FIG. 3 is a perspective view typically illustrating the electrode terminals to which the voltage sensing member of FIG. 2 is mounted, FIG. 4 is a partially enlarged view of FIG. 3, and FIG. 5 is a side view of FIG. 3.

Referring to these drawings together with FIG. 2, the voltage sensing member 200 includes a main body part 210 configured to surround the upper part of the bent connection part 110, an elastic connection part 220 disposed between sides of the bent connection part 110 and the main body part 210, and a wire connection part 230 extending from the top of the main body part 210. The main body part has a pair of parallel legs and a middle portion extending between the pair of legs, with the elastic connection part 220 attached to an inner surface of one of the legs. The wire connection part 230 extends from the middle portion.

The outside electrode terminal 112 of the bent connection part 110 is formed of copper, and the inside electrode terminal 111 of the bent connection part 110 is formed of aluminum. That is, copper constituting the outside electrode terminal 112, which has higher ductility than aluminum constituting the inside electrode terminal 111, is folded such that the copper surrounds the aluminum. As a result, the inside electrode terminal 111 is protected by the outside electrode terminal 112. In addition, the bent connection part 110 has a thickness equivalent to four times the thickness of each of the electrode terminals. As a result, damage to the electrode terminals is effectively prevented.

The elastic connection part 220 is implemented by a leaf spring which is repeatedly curved to form a plurality of contact points at the opposite sides of the bent connection part 110 and the main body part 210.

Contact between the bent connection part 110 and the elastic connection part 220 is elastically achieved, thereby effectively measuring voltage of the battery cells while greatly improving contact reliability between the bent connection part 110 and the elastic connection part 220.

Figure 6:
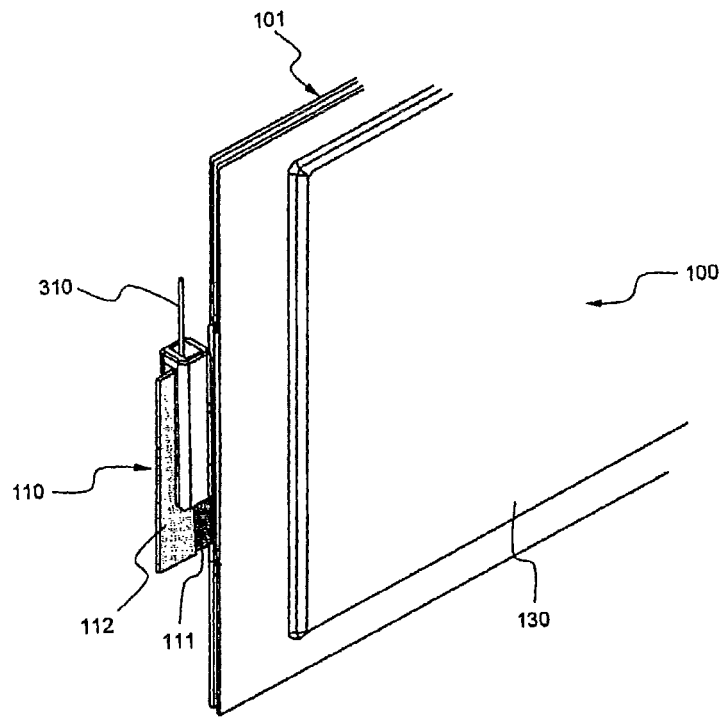
FIG. 6 is a partial perspective view illustrating an insulative top cap mounted to the voltage sensing member of FIG. 2.

FIG. 6 is a partial perspective view typically illustrating an insulative top cap mounted to the voltage sensing member of FIG. 2.

Referring to FIG. 6 together with FIG. 2, an insulative top cap 300 is further mounted to the outside of the main body part 210 of the voltage sensing member 200.

The insulative cap 300 is configured in a structure corresponding to the outside shape of the main body part 210. The insulative cap 300 is further mounted to the outside of the main body part 210 in a state in which the main body part 210 is mounted to the bent connection part 110.

A connection wire 310, extending upward from the top of the insulative cap 300, is connected to the wire connection part 230 of the voltage sensing member 200.

The insulative cap 300 serves to stably maintain a state in which the voltage sensing member 200 is mounted to the bent connection part 110. In addition, the insulative cap 300 serves to protect the voltage sensing member 200 and the bent connection part 110 from the outside.

Figure 7:
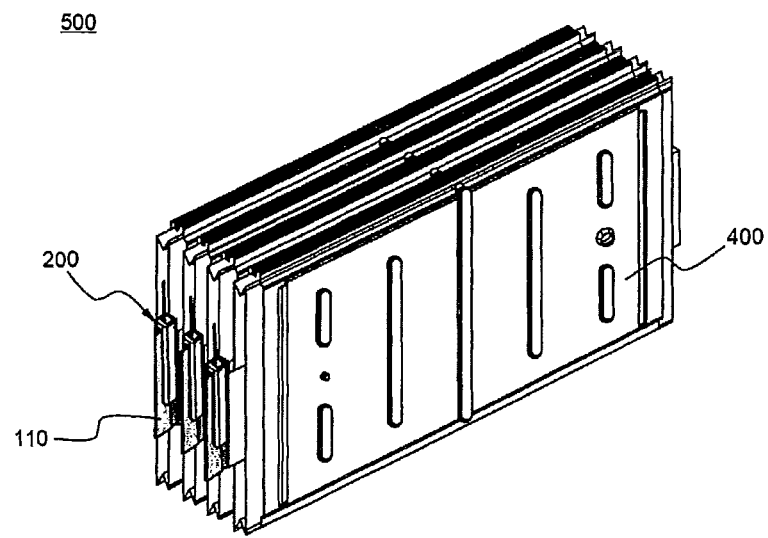
FIG. 7 is a perspective view illustrating a battery module according to an embodiment of the present invention.

FIG. 7 is a perspective view illustrating a battery module according to an embodiment of the present invention.

Referring to FIG. 7, two battery cells are mounted in a cell cover 400, such that the battery cells are surrounded by the cell cover 400, to constitute a unit module, and four unit modules are stacked to constitute a battery module 500.

The cell cover 400 serves to reinforce mechanical strength of the battery cells mounted in the cell cover 40. In addition, the cell cover 400 serves to enable the battery cells to be easily mounted in a module case (not shown).

Also, voltage sensing members 200 are mounted to the upper parts of bent connection parts 110 stacked in a state in which the bent connection parts 110 are perpendicular to the ground. Consequently, moisture generated and condensed at the voltage sensing members and the bent connection parts during use of the battery module for a long period of time falls to the ground by gravity, with the result that moisture is prevented from accumulating at the voltage sensing members and the bent connection parts, and therefore, it is possible to effectively prevent occurrence of sensing defects.

The invention claimed is:

1. A battery module comprising:
    two or more battery cells, each battery cell having electrode terminals formed at one end or opposite ends thereof, the battery cells being stacked in a state in which the battery cells are electrically connected to each other,
    wherein the electrode terminals of the battery cells are formed of plate-shaped conductive members,
    wherein the electrode terminals of the battery cells are folded such that the electrode terminals are in tight contact with each other to form a bent connection part at an electrical connection region between the battery cells,
    wherein a voltage sensing member is mounted to the bent connection part to surround the bent connection part,
    wherein the battery cells are stacked so that the bent connection part is perpendicular to the ground, and
    wherein the voltage sensing member comprises:
        a main body part configured to surround an upper end of the bent connection part;
        an elastic connection part contacting a side of the bent connection part and the main body part; and
        a wire connection part extending from a top of the main body part.

2. The battery module according to claim 1, wherein each of the battery cells is a plate-shaped battery cell.

3. The battery module according to claim 2, wherein the plate-shaped battery cell is a secondary battery, and wherein an electrode assembly is mounted in a battery case formed of a laminate sheet including a resin layer and a metal layer, and a cathode lead made of aluminum and an anode lead made of copper protrude from one end or opposite ends of the battery case.

4. The battery module according to claim 3, wherein the secondary battery is a lithium secondary battery.

5. The battery module according to claim 1, wherein the electrical connection region between the battery cells is a series connection region between the battery cells.

6. The battery module according to claim 1, wherein the electrode terminals are connected to each other at the bent connection part by welding.

7. The battery module according to claim 1, wherein the bent connection part is configured in a structure in which an electrode terminal exhibiting relatively low ductility constitutes an inside electrode terminal, and an electrode terminal exhibiting relatively high ductility constitutes an outside electrode terminal.

8. The battery module according to claim 7, wherein the outside electrode terminal is made of copper, and the inside electrode terminal is made of aluminum.

9. The battery module according to claim 1, wherein the elastic connection part is a leaf spring which is repeatedly curved to form two or more contact points at the sides of the bent connection part and the main body part.

10. The battery module according to claim 1, wherein the elastic connection part comprises two elastic connection parts connected to the opposite sides of the bent connection part.

11. The battery module according to claim 1, wherein the voltage sensing member further comprises an insulative cap mounted to an outside of the main body part.

12. The battery module according to claim 11, wherein the insulative cap is connected to the bent connection part in a structure in which a connection wire is disposed at a top of the insulative cap.

13. The battery module according to claim 11, wherein the insulative cap is configured in a structure corresponding to an outside shape of the main body part, and the insulative cap is further mounted to an outside of the main body part in a state in which the main body part is mounted to the bent connection part.

14. The battery module according to claim 1, wherein the linear connection part is a wire connection part.

15. The battery module according to claim 1, wherein two or more battery cells are mounted in a cell cover, such that the battery cells are surrounded by the cell cover, to constitute a unit module, and two or more unit modules are stacked to constitute a battery module.

16. A battery pack comprising:
a battery module according to claim 1.

17. The battery pack according to claim 16 wherein the battery pack is a power source for electric vehicles, hybrid electric vehicles, plug-in hybrid electric vehicles, electric motorcycles, or electric bicycles.

18. The battery module according to claim 1, wherein
the main body is a U-shaped main body having a pair of parallel legs and a middle portion extending between the pair of legs.

19. A battery module comprising:
two or more battery cells, each battery cell having electrode terminals formed at one end or opposite ends thereof, the battery cells being stacked in a state in which the battery cells are electrically connected to each other, the electrode terminals of the battery cells formed of plate-shaped conductive members, and the electrode terminals of the battery cells folded such that the electrode terminals are in tight contact with each other to form a bent connection part at an electrical connection region between the battery cells; and
a voltage sensing member mounted to the bent connection part to surround the bent connection part,
wherein the voltage sensing member comprises:
a main body part configured to surround the bent connection part;
an elastic connection part contacting a side of the bent connection part and the main body part; and
a wire connection part extending from a top of the main body part.

20. The battery module according to claim 19, wherein the battery cells are stacked so that the bent connection part is vertically oriented and has an upper end and a lower end, and
wherein the main body part surrounds the upper end of the bent connection part.

* * * * *